(12) United States Patent
Shimada

(10) Patent No.: US 10,055,852 B2
(45) Date of Patent: Aug. 21, 2018

(54) IMAGE PROCESSING SYSTEM AND METHOD FOR DETECTION OF OBJECTS IN MOTION

(71) Applicant: SONY CORPORATION, Tokyo (JP)

(72) Inventor: Junji Shimada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 67 days.

(21) Appl. No.: 15/238,659

(22) Filed: Aug. 16, 2016

(65) Prior Publication Data

US 2017/0287144 A1   Oct. 5, 2017

Related U.S. Application Data

(60) Provisional application No. 62/317,782, filed on Apr. 4, 2016.

(51) Int. Cl.
*G06T 7/246* (2017.01)
*G06T 7/20* (2017.01)
*G06T 7/00* (2017.01)

(52) U.S. Cl.
CPC .......... *G06T 7/2033* (2013.01); *G06T 7/0042* (2013.01); *G06T 2207/10004* (2013.01)

(58) Field of Classification Search
CPC .......... G06T 7/20; G06T 7/246; G06T 7/254; G06T 7/70; G06T 7/80
See application file for complete search history.

(56) References Cited

U.S. PATENT DOCUMENTS

| | | | |
|---|---|---|---|
| 8,054,335 B2 | 11/2011 | Deng et al. | 348/208.1 |
| 8,558,903 B2 | 10/2013 | Liu et al. | 348/208.99 |
| 8,818,046 B2 | 8/2014 | Kurata et al. | 382/107 |
| 9,213,898 B2 | 12/2015 | Gurbuz | G06K 9/00711 |
| 2013/0258141 A1* | 10/2013 | Kim et al. | H04N 5/235 348/241 |
| 2015/0319375 A1 | 11/2015 | Gurbuz | H04N 5/2625 |

* cited by examiner

*Primary Examiner* — Andrew W Johns
(74) *Attorney, Agent, or Firm* — Chip Law Group

(57) ABSTRACT

Various aspects of a system and a method are provided for detection of objects in motion are disclosed herein. In accordance with an embodiment, the system includes an electronic device, which is configured to compute a first sensor offset for a current frame based on a first motion vector and a second motion vector. A validation of the first motion vector is determined based on the second motion vector and one or more criteria. An object in motion from the current frame is extracted based on the first sensor offset of the current frame and the determined validation of the first motion vector.

20 Claims, 5 Drawing Sheets

IMAGE PROCESSING SYSTEM AND METHOD FOR DETECTION OF OBJECTS IN MOTION

CROSS-REFERENCE TO RELATED APPLICATIONS/INCORPORATION BY REFERENCE

This application claims priority to U.S. provisional Patent Application Ser. No. 62/317,782 filed on Apr. 4, 2016, the entire content of which is hereby incorporated by reference.

FIELD

Various embodiments of the disclosure relate to an image processing system and method for detection of objects in motion. More specifically, various embodiments of the disclosure relate to image processing system and method for detection of objects in motion by use of motion sensors.

BACKGROUND

Recent advancements in the field of image processing have led to development of various methods and techniques for detection and extraction of objects in motion. Typically, the detection of the objects in motion is performed based on a global motion vector for each object in motion. The global motion vector may be calculated based on comparison of a current frame with respect to a previous frame.

However, in certain scenarios, the global motion vector may be calculated incorrectly due to various intrinsic and/or extrinsic factors, such as large foreground movement, blur, parallax, illuminance change, and/or roller shutter effect. Accordingly, the objects in motion may not be detected correctly. In such scenarios, motion sensors, such as a gyro sensor, may be utilized to increase the accuracy of the detection of objects in motion. However, the motion sensors, when in a standstill state, may result in an unstable output and a variable offset value. The output of the motion sensors may be further affected by other factors also, such as mechanical vibrations and change in temperature. This may result in continuous variation of the output of the motion sensors with respect to time, referred to as "drift". In order to avoid such drift, high pass filters (HPFs) may be applied to the output of the motion sensors. However, the usage of HPFs may generate a fake output when the object in motion comes to rest suddenly. Alternatively, in order to avoid such drift, a thermistor and an accelerometer may be utilized. However, such devices may comprise individual variations and the characteristics may change according to change in temperature. Thus, an advanced image processing technique may be required to avoid the drift phenomenon of the motion sensor and efficiently extract objects in motion.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An image processing system and method are provided for detection of objects in motion substantially as shown in, and/or described in connection with, at least one of the figures, as set forth more completely in the claims.

These and other features and advantages of the present disclosure may be appreciated from a review of the following detailed description of the present disclosure, along with the accompanying figures, in which like reference numerals refer to like parts throughout.

DETAILED DESCRIPTION

Figure 1:
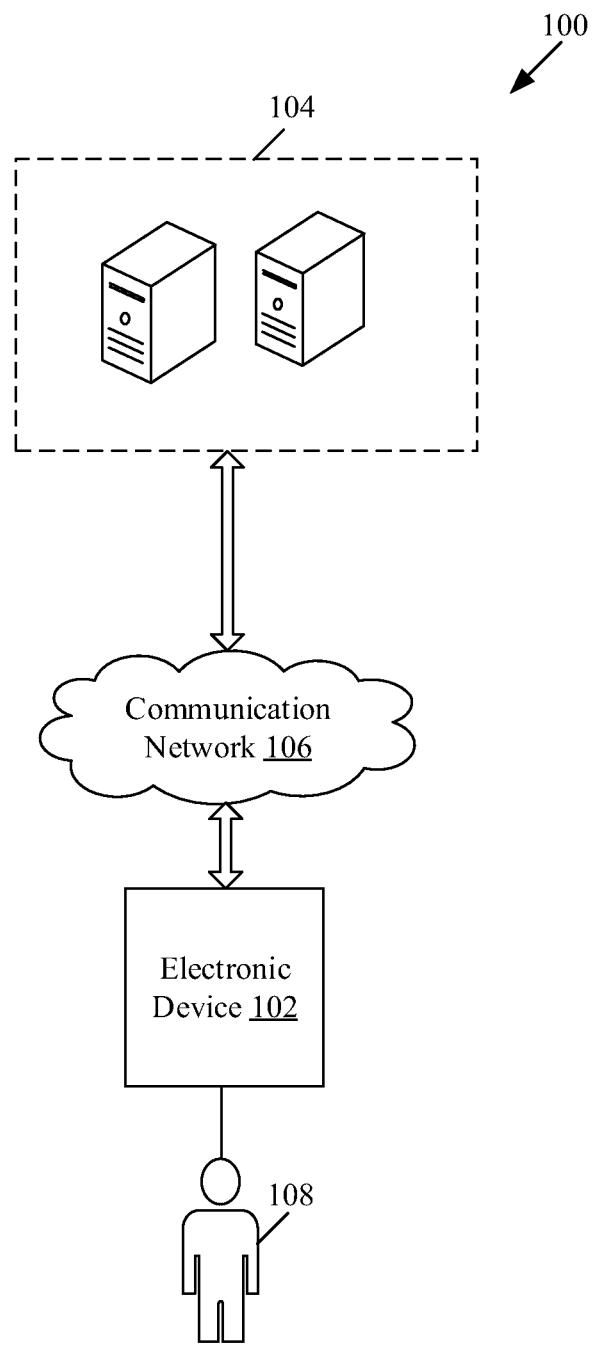
FIG. 1 is a block diagram that illustrates a network environment for detection of objects in motion in an image processing system, in accordance with an embodiment of the disclosure.

The following described implementations may be found in the disclosed system and method for detection of objects in motion. Exemplary aspects of the disclosure may include an image processing method implemented in an electronic device. The image processing method may include computation of a first sensor offset for a current frame based on a first motion vector and a second motion vector. Furthermore, the image processing method may include determination of validation of the first motion vector based on the second motion vector and one or more criteria. Based on the computed first sensor offset and the determined validation of the first motion vector, the object in motion from the current frame may be extracted.

In accordance with an embodiment, the first motion vector may be computed based on a difference of pixel values of one or more pixels in a current frame with respect to a previous frame. The current frame and the previous frame may comprise at least an object in motion. In accordance with an embodiment, the second motion vector may be computed based on angular velocity information obtained from a sensor in the electronic device. In accordance with an embodiment, the first motion vector may correspond to an image-based global motion vector and the second motion vector may correspond to a motion sensor-based global motion vector.

In accordance with an embodiment, the first sensor offset may be utilized for correction of the computed first motion vector in an event that the first motion vector is determined to be invalid. In accordance with an embodiment, the extraction of the object in motion from the current frame may be based on the second motion vector in an event that the first motion vector is determined to be invalid.

In accordance with an embodiment, the one or more circuits in the electronic device may be further configured to determine a second sensor offset of a next frame based on the computed first sensor offset of the current frame in an event that the first motion vector is determined to be valid. In accordance with an embodiment, the one or more circuits in the electronic device may be further configured to determine a second sensor offset of a next frame based on a sensor offset of the previous frame in an event that the first motion vector is determined to be invalid.

In accordance with an embodiment, the first motion vector may be determined to be valid in an event that, in accordance with a first criterion of the one or more criteria, a distance between the first motion vector and the second motion vector is smaller than a determined first threshold value. In accordance with an embodiment, the first motion vector is determined to be valid in an event that, in accordance with a second criterion of the one or more criteria, an angle between said first motion vector and said second motion vector is smaller than a determined second threshold value. In accordance with an embodiment, the first motion vector may be further determined to be valid in an event that, in accordance with the second criterion of the one or more criteria, a magnitude of the second motion vector is smaller than a determined threshold noise value. In accordance with an embodiment, the first motion vector may be determined to be valid in an event that, in accordance with a third criterion of the one or more criteria, a rotational output of the sensor in the electronic device is smaller than a determined third threshold value.

In accordance with an embodiment, the first motion vector may be associated with a minimum sum of absolute difference of pixel values of one or more pixels between the current frame and the previous frame. In accordance with an embodiment, the computation of the second motion vector is further based on one or more device parameters of the electronic device. The one or more device parameters may comprise focal length of a lens of the electronic device, and number of horizontal pixels and width of an imager component included in the electronic device.

In accordance with an embodiment, the computation of the first sensor offset of the current frame may be based on a difference between the first motion vector and the second motion vector. In accordance with an embodiment, the computation of the first sensor offset of the current frame may be further dependent on a difference between the gradient of the first motion vector and the second motion vector.

In accordance with an embodiment, the electronic device may correspond to an imaging device that may be configured to capture the current frame and the previous frame. In accordance with an embodiment, the first sensor offset may correspond to an offset computed for a gyro sensor of the electronic device.

FIG. 1 is a block diagram that illustrates a network environment for detection of objects in motion in an image processing system, in accordance with an embodiment of the disclosure. With reference to FIG. 1, there is shown an exemplary network environment 100. The network environment 100 may include an electronic device 102, a server 104, a communication network 106, and one or more users, such as a user 108. With reference to FIG. 1, the electronic device 102 may be communicatively coupled to the server 104, via the communication network 106. The user 108 may be associated with the electronic device 102.

The electronic device 102 may comprise suitable logic, circuitry, interfaces, and/or code that may be configured to communicate with the server 104. The electronic device 102 may further include one or more circuits that may be configured to detect and extract one or more objects in motion in a video. Examples of the electronic device 102 may include, but are not limited to, an imaging device, such as a camera, a camcorder, an image- or video-processing device, a motion-capture system, and/or a projector.

The server 104 may comprise a suitable logic, circuitry, interfaces, and/or code that may be configured to communicate with the electronic device 102. The server 104 may further include one or more circuitries that may be configured to detect and extract one or more objects in motion in a video. Examples of the server 104 may include, but are not limited to a web server, a database server, a file server, an application server, or a combination thereof. The server 104 may be implemented by use of several technologies that are well known to those skilled in the art.

The communication network 106 may include a medium through which the electronic device 102 and the server 104, may communicate with each other. The communication network 106 may be a wired or wireless communication network. Examples of the communication network 106 may include, but are not limited to, a Wireless Fidelity (Wi-Fi) network, a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), a Metropolitan Area Network (MAN), and/or the Internet. Various devices in the network environment 100 may be configured to connect to the communication network 106, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols.

In operation, the electronic device 102 may correspond to an imaging device that may be used to capture a video of a scene. The captured video may include a plurality of image frames, such as at least a current frame and a previous frame. The captured video may further include at least an object in motion. The electronic device 102 may be configured to compute a first sensor offset for the current frame based on a first motion vector and a second motion vector.

Further, the electronic device 102 may be configured to compute the first motion vector based on a difference of pixel values of one or more pixels in the current frame with respect to the previous frame. In accordance with an embodiment, the first motion vector may correspond to an image-based global motion vector. The computation of the first motion vector, i.e. the image-based global motion vector, is explained in detail in FIG. 2.

Further, the electronic device 102 may be configured to compute a second motion vector based on angular velocity information. The angular velocity information may be received from a sensor included in the electronic device 102. The sensor included in the electronic device 102 may correspond to a gyro sensor. In accordance with an embodiment, the second motion vector may correspond to a motion sensor-based global motion vector, such as the gyro sensor-based global motion vector. The computation of the second motion vector, i.e. the motion sensor-based global motion vector, is explained in detail in FIG. 2.

The electronic device 102 may be configured to compute the first sensor offset of the current frame based on a difference between the first motion vector and the second motion vector. The electronic device 102 may be further configured to compute the first sensor offset of the current frame based on a difference between the gradient of the first motion vector and the second motion vector. In accordance with an embodiment, the first sensor offset may correspond to an offset computed for a motion sensor, such as a gyro sensor, of the electronic device 102.

The electronic device 102 may be further configured to determine a validation of the first motion vector, based on the second motion vector and one or more criteria. The validation determination of the first motion vector is explained in detail in, for example, FIG. 2 and FIGS. 4A and 4B. The one or more criteria may include at least a first, a second, and a third criterion. In accordance with an embodiment, the first sensor offset may be utilized for correction of the first motion vector in an event that the first motion vector is determined to be invalid.

In accordance with an embodiment, the first criterion may correspond to a distance between the first motion vector and the second motion vector that may be smaller than a determined first threshold value. In accordance with an embodiment, the second criterion may correspond to an angle between the first motion vector and the second motion vector that may be smaller than a determined second threshold value. The second criterion may further correspond to a magnitude of the second motion vector that may be smaller than a determined threshold noise value. In accordance with an embodiment, the third criterion of the one or more criteria for the verification of the first motion vector may correspond to a rotational output of the sensor in the electronic device that may be smaller than a determined third threshold value. Based on the computed first sensor offset and determined validation of the first motion vector, the electronic device 102 may be further configured to extract objects in motion from the current frame.

In accordance with an embodiment, the electronic device 102 may be further configured to determine a second sensor offset of a next frame based on the computed first sensor offset of the current frame in an event that the first motion vector is determined to be valid. Further, the electronic device 102 may be configured to determine the second sensor offset of the next frame based on a first sensor offset of the previous frame in an event that the first motion vector is determined to be invalid.

In accordance with another aspect of the disclosure, the electronic device 102 may be configured to transmit the plurality of image frames, such as the current frame and the previous frame, to the server 104, via the communication network 106. The server 104 may be configured to process the received plurality of image frames, received from the electronic device 102, for computation of the first sensor offset based on the first motion vector and the second motion vector. The server 104 may be further configured to validate the accuracy of the first motion vector. Based on the computed first sensor offset and the validation of the first motion vector, the server 104 may be configured to extract the object in motion from the current frame. The server 104 may be further configured to transmit the extracted objects in motion to the electronic device 102, via the communication network 106.

Figure 2:
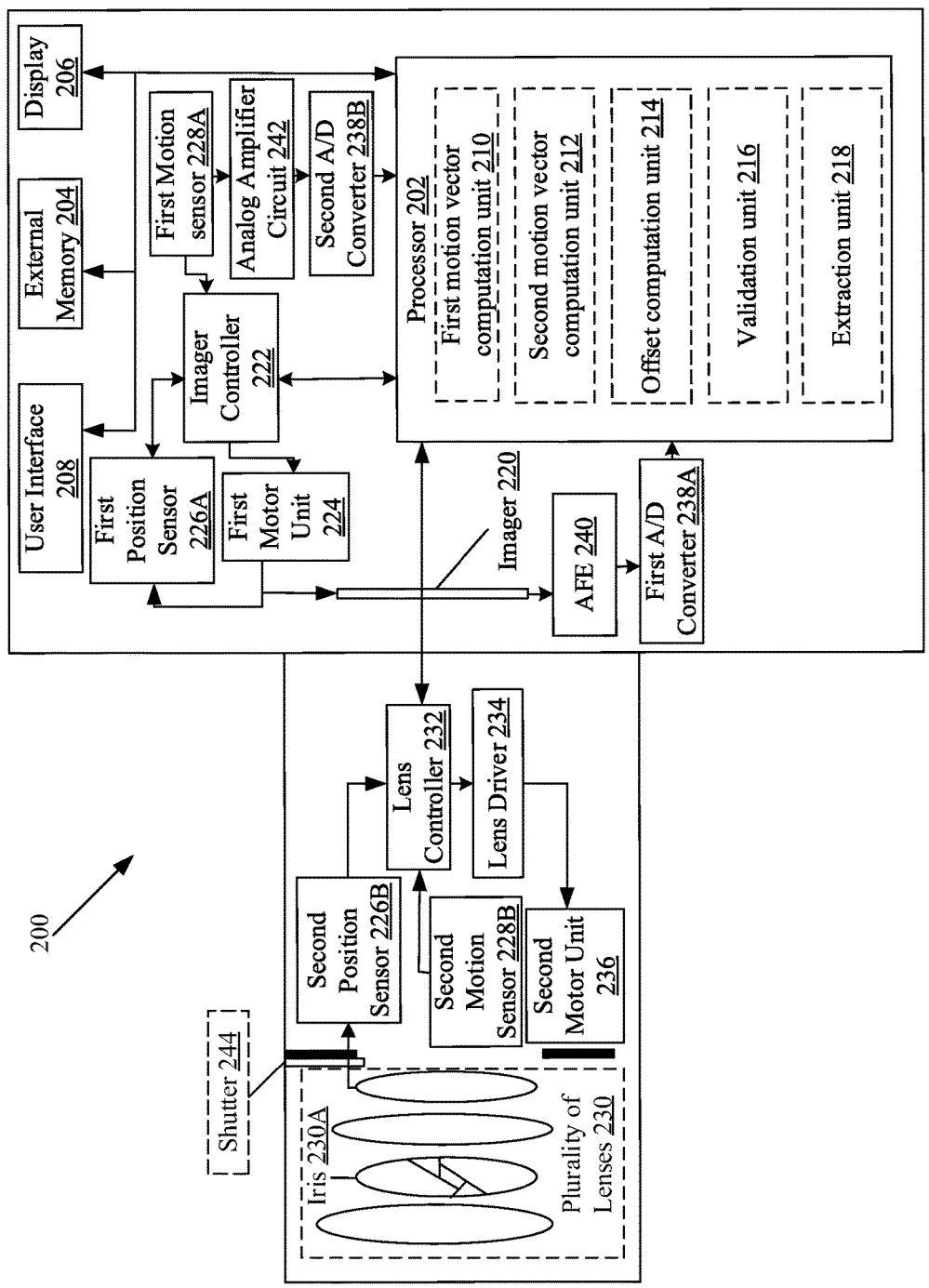
FIG. 2 is a block diagram of an image processing system, in accordance with an embodiment of the disclosure.

FIG. 2 illustrates a block diagram of an image processing system, in accordance with an embodiment of the disclosure. With reference to FIG. 2, there is shown a block diagram 200 that may include one or more circuits configured to extract objects in motion from the plurality of images. The one or more circuits may include a processor 202, an external memory 204, a display 206, and a user interface 208.

In accordance with an embodiment, the processor 202 may further include a plurality of motion vector computation units, such as a first motion vector computation unit 210 and a second motion vector computation unit 212, an offset computation unit 214, a validation unit 216, and an extraction unit 218. The block diagram 200 may further include an imager 220, with defined dimensions, controlled by an imager controller 222 for steady-shot with the aid of a first motor unit 224. Furthermore, the block diagram 200 may include a plurality of sensors, such as a first position sensor 226A to get the position of imager 220, a second position sensor 226B to get the position of a lens of a plurality of lenses 230 for steady-shot, a first motion sensor 228A for steady-shot, and a second motion sensor 228B for steady-shot. The block diagram 200 may further include the plurality of lenses 230, controlled by a lens controller 232 and a lens driver 234 with aid of a second motor unit 236. The plurality of lenses 230 may further include an iris 230A. There is further shown two analog to digital (A/D) converters, such as a first A/D converter 238A and a second A/D converter 238B. Further, there is shown an analog front end (AFE) unit 240 and an analog amplifier circuit 242. There is further shown a shutter 244 in the block diagram 200. The shutter 244 may allow light to pass for a determined period, exposing the imager 220 to light in order to capture a plurality of image frames.

As an exemplary embodiment, the block diagram 200 is shown to be implemented in an exemplary electronic device, such as the electronic device 102. However, in accordance with an embodiment, the block diagram 200 may be implemented in an exemplary server, such as the server 104, without deviation from the scope of the disclosure.

With reference to FIG. 2, the one or more circuits, such as the processor 202, the external memory 204, and the display 206 may be interconnected with each other. The user interface 208 may be rendered in the display 206. The processor 202 may be configured to receive the output of plurality of sensors, such as the first position sensor 226A and the first motion sensor 228A. The output of the plurality of sensors, such as the first position sensor 226A and the first motion sensor 228A, may be provided to the plurality of the motion vector generation units, such as the first motion vector computation unit 210 and the second motion vector computation unit 212 included in the processor 202.

In accordance with an embodiment, the output of each of the plurality of the motion vector generation units may be provided to both the offset computation unit 214 and the validation unit 216. The output of the offset computation unit 214 may be provided to the validation unit 216. The output of the offset computation unit 214 may be further provided to the extraction unit 218. The output of the validation unit 216 may be provided to the extraction unit 218. The output of the validation unit 216 may be further provided to the offset computation unit 214.

In accordance with an embodiment, the imager 220 may be connected to one of the plurality of sensors, such as the first position sensor 226A. The plurality of lenses 230 may be in connection with the lens controller 232 and the lens driver 234. The plurality of lenses 230 may be controlled by the lens controller 232 in conjunction with the processor 202. The output of the imager 220 may be provided to the AFE unit 240. Further, the output of the AFE unit 240 may be provided to the first A/D converter 238A. The output of the first motion sensor 228A may be provided to the analog amplifier circuit 242. Further, the output of the analog amplifier circuit 242 may be provided to the second A/D converter 238B.

The processor 202 may comprise suitable logic, circuitry, interfaces, and/or code that may be operable to execute a set of instructions stored in the external memory 204. The processor 202 may be further configured to extract the object in motion from a video, captured by the electronic device 102. The processor 202 may be implemented based on a number of electronic control unit technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The external memory 204 may comprise suitable logic, circuitry, and/or interfaces that may be operable to store a machine code and/or a computer program with at least one code section executable by the processor 202. The external memory 204 may be further operable to store a plurality of image frames, such as the current frame and the previous frame, captured by the electronic device 102. The external memory 204 may be further operable to store operating systems and associated applications of the electronic device 102. Examples of implementation of the external memory 204 may include, but are not limited to, Random Access Memory (RAM), Read Only Memory (ROM), Hard Disk Drive (HDD), Flash memory, and/or a Secure Digital (SD) card.

The display 206 may comprise suitable circuitry and/or interfaces that may be operable to render the user interface 208. The display 206 may be realized through several known technologies, such as, but not limited to, Liquid Crystal Display (LCD) display, Light Emitting Diode (LED) display, and/or Organic LED (OLED) display technology.

The user interface 208 may comprise suitable interfaces that may be rendered on the display 206 of the electronic device 102. The user interface 208 may present a video, captured by the electronic device 102. The user interface 208 may further present resultant image frames generated by the electronic device 102.

The first motion vector computation unit 210 may comprise suitable logic, circuitry, and/or interfaces that may be configured to implement various mathematical functions for computation of an image-based global motion vector from a current frame and a previous frame. The first motion vector computation unit 210 may be implemented as a separate processor or circuitry in the electronic device 102. The first motion vector computation unit 210 and the processor 202 may be implemented as an integrated processor or a cluster of processors that perform the functions of the first motion vector computation unit 210 and the processor 202. The first motion vector computation unit 210 may be implemented as a set of instructions stored in the external memory 204, which on execution by the processor 202 may perform the functions and operations of the electronic device 102.

The second motion vector computation unit 212 may comprise suitable logic, circuitry, and/or interfaces that may be configured to receive information from a sensor, such as the first motion sensor 228A, for computation of a motion sensor-based global motion vector. The motion sensor-based global motion vector may be computed based on angular velocity information obtained from the first motion sensor 228A. The second motion vector computation unit 212 may be implemented as a separate processor or circuitry in the electronic device 102. The second motion vector computation unit 212 and the processor 202 may be implemented as an integrated processor or a cluster of processors that perform the functions of the second motion vector computation unit 212 and the processor 202. The second motion vector computation unit 212 may be implemented as a set of instructions stored in the external memory 204, which on execution by the processor 202 may perform the functions and operations of the electronic device 102.

The offset computation unit 214 may comprise suitable logic, circuitry, and/or interfaces that may be configured to receive information from the first motion vector computation unit 210 and the second motion vector computation unit 212 for computation of an offset of a motion sensor, such as the first motion sensor 228A. The offset computation unit 214 may be implemented as a separate processor or circuitry in the electronic device 102. The offset computation unit 214 and the processor 202 may be implemented as an integrated processor or a cluster of processors that perform the functions of the offset computation unit 214 and the processor 202. The offset computation unit 214 may be implemented as a set of instructions stored in the external memory 204, which on execution by the processor 202 may perform the functions and operations of the electronic device 102.

The validation unit 216 may comprise suitable logic, circuitry, and/or interfaces that may be configured to perform the validation of the first motion vector, such as the image-based global motion vector, by use of the second motion vector and the one or more criteria. The validation unit 216 may be implemented as a separate processor or circuitry in the electronic device 102. The validation unit 216 and the processor 202 may be implemented as an integrated processor or a cluster of processors that perform the functions of the validation unit 216 and the processor 202. The validation unit 216 may be implemented as a set of instructions stored in the external memory 204, which on execution by the processor 202 may perform the functions and operations of the electronic device 102.

The extraction unit 218 may comprise suitable logic, circuitry, and/or interfaces that may be configured to extract the objects in motion from the current frame. The extraction may be based on the computed offset of a motion sensor, such as the first motion sensor 228A, by the offset computation unit 214 and the determined validation of the first motion vector provided by the validation unit 216. The extraction unit 218 may be implemented as a separate processor or circuitry in the electronic device 102. The extraction unit 218 and the processor 202 may be implemented as an integrated processor or a cluster of processors that perform the functions of the extraction unit 218 and the processor 202. The extraction unit 218 may be implemented as a set of instructions stored in the external memory 204, which on execution by the processor 202 may perform the functions and operations of the electronic device 102.

The imager 220 may comprise suitable circuitry and/or interfaces that may be configured to transform the images from the analog light signals into a series of digital pixels without any distortion. Examples of implementation of the imager 220 may include, but are not limited to, Charge-Coupled Device (CCD) imagers and Complementary Metal-Oxide-Semiconductor (CMOS) imagers.

The imager controller 222 may comprise suitable logic, circuitry, and/or interfaces that may be configured to control orientation or direction of the imager 220, based on the instructions received from the processor 202. The imager controller 222 may be implemented by use of several technologies that are well known to those skilled in the art.

The first motor unit 224 may comprise suitable logic, circuitry, and/or interfaces that may be configured to drive the imager 220, based on the output of the imager controller 222. The first motor unit 224 may be implemented by use of several technologies that are well known to those skilled in the art.

The position sensors, such as the first position sensor 226A and the second position sensor 226B may comprise suitable logic, circuitry, and/or interfaces that may be configured to determine position, such as absolute position or a displacement position, of the various optical components, such as the plurality of lenses 230 and the imager 220.

Examples of implementation of the first position sensor 226A and the second position sensor 226B may include, but are not limited to, a linear position sensor, an angular position sensor, or a multi-axis position sensor.

The motion sensors, such as the first motion sensor 228A and the second motion sensor 228B, may comprise suitable logic, circuitry, and/or interfaces that may be configured to detect movement (linear or angular) in a device, such as the electronic device 102. Examples of implementation of the first motion sensor 228A and the second motion sensor 228B may include, but are not limited to, gyro sensor, accelerometer, and/or the like.

The plurality of lenses 230 may correspond to an optical lens or assembly of lenses used in conjunction with a camera body and mechanism to capture images of objects. The images may be captured either on photographic film or on other media, capable to store an image chemically or electronically.

The lens controller 232 may comprise suitable logic, circuitry, and/or interfaces that may be configured to control various characteristics, such as zoom, focus, or aperture, of the plurality of lenses 230. The lens controller 232 may internally be a part of an imaging unit of the electronic device 102 or may be a stand-alone unit, in conjunction with the processor 202. The lens controller 232 may be implemented by use of several technologies that are well known to those skilled in the art.

The lens driver 234 may comprise suitable logic, circuitry, and/or interfaces that may be configured to perform zoom and focus control and iris control, based on instructions received from the lens controller 232. The lens driver 234 may be implemented by use of several technologies that are well known to those skilled in the art.

The second motor unit 236 may comprise suitable logic, circuitry, and/or interfaces that may be configured to control the plurality of lenses 230, based on the output of the lens controller 232 and the lens driver 234. The second motor unit 236 may be implemented by use of several technologies that are well known to those skilled in the art.

The A/D converters, such as the first A/D converter 238A and the second A/D converter 238B, may comprise suitable logic, circuitry, and/or interfaces that may be configured to convert the output of the optical component, such as the imager 220, and the output of the first motion sensor 228A from analog signals to digital signals. Examples of implementation of the first A/D converter 238A and the second A/D converter 238B may include, but are not limited to, direct-conversion A/D converter, successive-approximation A/D converter, integrating A/D converter, sigma-delta A/D converter, and/or the like.

The AFE unit 240 may comprise suitable logic, circuitry, and/or interfaces that may be configured to utilize sensitive analog amplifiers (such as operational amplifiers and filters) and/or application-specific integrated circuits (such as sensors and radio receivers) to provide a configurable and flexible electronics functional block. The AFE unit 240 may be configured to interface a variety of sensors to an antenna, AD converter, and/or a microcontroller. The AFE unit 240 may be implemented by use of several technologies that are well known to those skilled in the art.

The analog amplifier circuit 242 may comprise suitable logic, circuitry, and/or interfaces that may be configured to increase or boost the power of an analog signal. The analog amplifier circuit 242 may be implemented by use of several technologies that are well known to those skilled in the art.

In operation, an exemplary electronic device, such as the electronic device 102, may capture a plurality of image frames, through the plurality of lenses 230. The plurality of lenses 230 may be controlled by the lens controller 232 and the lens driver 234, in conjunction with the processor 202. The plurality of lenses 230 may be controlled based on an input signal received from a user. The input signal may be provided by the user, via a selection of a graphical button rendered on the user interface 208 or a button-press event of a hardware button available at the electronic device 102. Alternatively, the electronic device 102, may retrieve the plurality of image frames pre-stored in the external memory 204. The plurality of image frames may correspond to a video, such as a video clip, and may include at least a current frame and a previous frame.

The first motion vector computation unit 210 in the processor 202 may be configured to compute a first motion vector, such as an image-based global motion vector. The first motion vector computation unit 210 may compute the first motion vector based on a determination of difference of pixel values of one or more pixels between the current frame and the previous frame. Such difference of pixel values of one or more pixels between the current frame and the previous frame may be determined based on various mathematical functions, known in the art. Examples of such mathematical functions may include, but are not limited to, a sum of absolute difference (SAD) function, a sum of squared difference (SSD) function, a weighted sum of absolute difference (WSAD) function, and/or a weighted sum of squared difference (WSSD) function. Notwithstanding, other mathematical functions known in the art may also be implemented for determination of the difference of pixel values, without deviation from the scope of the disclosure.

In accordance with an exemplary embodiment, the processor 202 may determine the difference of pixel values of one or more pixels between the current frame and the previous frame, based on the SAD function expressed as the following mathematical expression (1):

$$\text{SAD} = \Sigma_{j=0}^{N-1} \Sigma_{i=0}^{M-1} I_t(i,j) - I_{t-1}(i,j) \tag{1}$$

where, $I_t(i,j)$ corresponds to an illuminance value of a pixel in the current frame located at $i^{th}$ row and $j^{th}$ column;

$I_{t-1}(i,j)$ corresponds to an illuminance value of a pixel in the previous frame located at $i^{th}$ row and $j^{th}$ column;

N, M corresponds to maximum values of $i^{th}$ row and $j^{th}$ column in the current frame and the previous frame; and SAD corresponds to sum of absolute difference between one or more pixels of the current frame and the previous frame.

Based on the determined difference of pixel values of one or more pixels (based on the SAD function), the processor 202 may further determine a minimum SAD of pixel values. The minimum SAD of pixel values may be determined, based on the following mathematical expression (2):

$$\arg_{i,j} \min \text{SAD} \tag{2}$$

where, $\arg_{i,j}$ corresponds to argument of the minimum SAD of pixel values.

Thereafter, based on the argument of the minimum SAD of pixel values, the first motion vector computation unit 210 may compute the first motion vector, $\overrightarrow{v_{image\_based}}$. In accordance with an embodiment, the first motion vector may correspond to an image-based global motion vector that may include an indication of movement of pixels in the current frame with respect to the previous frame. Such movement of the pixels may be represented by the following mathematical expression (3):

$$\text{movement}_{image\_based}[\text{pixel}] = \vec{v}_{image\_based} \qquad (3)$$

Further, the second motion vector computation unit 212 in the processor 202 may be configured to compute a second motion vector, such as the motion sensor-based global motion vector. The second motion vector computation unit 212 may compute the second motion vector based on angular velocity information provided by one of the plurality of sensors, such as the first motion sensor 228A. The computation of the second motion vector may be further based on one or more device parameters of the exemplary electronic device, such as the electronic device 102. Examples of the one or more device parameters may include, but are not limited to, effective focal length of the plurality of lenses 230 and number of horizontal pixels and width of the imager 220.

Thereafter, the second motion vector computation unit 212 may determine a motion sensor-based global motion vector, $\vec{v}_{gyro\_based}$. The second motion vector may indicate movement of pixels in the current frame with respect to the previous frame based on one of the plurality of sensors, such as the first motion sensor 228A. Such movement of the pixels may be represented by the following mathematical expression (4):

$$\text{movement}_{gyro}[\text{pixel}] = \frac{\text{movement}_{gyro}[m]}{\text{Imager size per pixel }[m]} \qquad (4)$$

where, $$\text{movement}_{gyro}[m] = f\,\tan\!\left(\theta\frac{\pi}{180}\right);$$

and where,

θ corresponds to moving angle, computed based on angular velocity information, $\vec{w}$ [deg/sec], provided from one of the plurality of sensors, such as the first motion sensor 228A, during time Δt [sec]; and f [mm] corresponds to focal length of a lens.

$$\text{Imager size per pixel }[m] = X/H * 10^{-3}$$

where,

X corresponds to width of the imager 220;

H corresponds to the number of horizontal pixels of the imager 220.

In accordance with an embodiment, the first motion vector computation unit 210 and the second motion vector computation unit 212 may communicate the computed first motion vector and the second motion vector, respectively, to the offset computation unit 214 and the validation unit 216. The offset computation unit 214 may be configured to compute a first sensor offset based on the first motion vector and the second motion vector computed by the first motion vector computation unit 210 and the second motion vector computation unit 212, respectively. In accordance with an embodiment, the first sensor offset may correspond to an offset computed for a motion sensor, such as the first motion sensor 228A, of the electronic device 102.

In accordance with an embodiment, in an event that the first motion sensor 228A is in a standstill state, the first sensor offset may be initialized to a default value, such as $\vec{x}_{gyro_{preset}}$, as per factory settings. The default value may be used to normalize the output of the first motion sensor 228A, as expressed by the following mathematical expression (5):

$$\vec{x}_{gyro_t} = \vec{f}_{gyro}(\omega) - \vec{x}_{gyro_{preset}} \qquad (5)$$

where, $\vec{x}_{gyro_t}$ corresponds to the gyro data that does not reflect the dc component at time t; and $\vec{f}_{gyro}(\omega)$ corresponds to the second motion vector computed by the second motion vector computation unit 212.

In accordance with an embodiment, the offset computation unit 214 may be configured to initialize various parameters related to the first motion vector, the second motion vector, and the motion sensor. Various initializations may be given by the following mathematical expressions (6), (7), (8), (9) and (10):

$$\vec{x}_{gyro\_IIR_t} = \vec{x}_{gyro_t} \qquad (6)$$

$$\vec{x}_{image\_based\_IIR_t} = \vec{x}_{image\_based_t} \qquad (7)$$

$$\vec{x}_{grad\_gyro_t} = \vec{0} \qquad (8)$$

$$\vec{x}_{grad\_image\_based_t} = \vec{0} \qquad (9)$$

$$\vec{x}_{gyro\_dc\_t} = \vec{x}_{gyro_{preset}} \qquad (10)$$

where, $\vec{x}_{gyro_t}$ corresponds to the gyro data that does not reflect the dc component at time t;

$\vec{x}_{image\_based_t}$ corresponds to the normalized image-based data at time t;

$\vec{x}_{grad_{image\_based_t}}$ corresponds to the gradient of the output of image-based global motion vector at time t;

$\vec{x}_{grad\_gyro_t}$ corresponds to the gradient of the output of gyro sensor at time t (does not reflect the DC component);

$\vec{x}_{gyro\_dc\_t}$ corresponds to the offset DC component of the first motion sensor 228A (gyro sensor) at time t; and $\vec{x}_{gyro_{preset}}$ corresponds to the default value.

In accordance with an embodiment, the first motion vector and the second motion vector computed by the first motion vector computation unit 210 and the second motion vector computation unit 212, respectively, may be applied to infinite impulse response (IIR) filters (not shown). The IIR filters may be configured to remove the noise components of the first motion vector and the second motion vector. In accordance with an embodiment, the electronic device 102 may be configured to compute the first sensor offset of the current frame based on a difference between the first motion vector and the second motion vector. The difference between the first motion vector and the second motion vector may be mathematically expressed by the following mathematical expression (11):

$$\vec{x}_{diff_t} = \vec{x}_{gyro\_IIR_t} - \vec{x}_{image\_based\_IIR_t} \qquad (11)$$

where, $\vec{x}_{diff_t}$ corresponds to the difference between the first motion vector and the second motion vector at time t;

$\vec{x}_{gyro\_IIR_t}$ corresponds to the normalized gyro data that does not reflect DC component at time t; and $\vec{x}_{image\_based\_IIR_t}$ corresponds to the normalized image-based data after IIR filter at time t.

In accordance with an embodiment, the electronic device 102 may be further configured to compute the first sensor offset of the current frame based on a difference between the gradient of the first motion vector and the second motion vector. In accordance with an embodiment, the gradient of the first motion vector may be computed based on the following mathematical expression (12):

$$\vec{x}_{grad\_image\_based_t} = \vec{x}_{image\_based\_IIR_t} - \vec{x}_{image\_based\_IIR_{t-1}} \quad (12)$$

where, $\vec{x}_{grad_{image\_based_t}}$ corresponds to the gradient of the output of image-based global motion vector at time t;

$\vec{x}_{image\_based\_IIR_t}$ corresponds to the normalized image-based data after IIR filter at time t; and $\vec{x}_{image\_based\_IIR_{t-1}}$ corresponds to the normalized image-based data after IIR filter at time t−1.

In accordance with an embodiment, the gradient of the second motion vector may be computed based on the following mathematical expression (13):

$$\vec{x}_{grad\_gyro_t} = \vec{x}_{gyro\_IIR_t} - \vec{x}_{gyro\_IIR_{t-1}} \quad (13)$$

where, $\vec{x}_{grad\_gyro_t}$ corresponds to the gradient of the output of gyro sensor at time t (does not reflect the DC component);

$\vec{x}_{gyro\_IIR_t}$ corresponds to the normalized gyro data at time t (does not reflect DC component); and $\vec{x}_{gyro\_IIR_{t-1}}$ corresponds to the normalized gyro data at time t−1 (does not reflect DC component).

The difference between the gradient of the first motion vector and the second motion vector may be expressed by the following mathematical expression (14):

$$\vec{x}_{grad\_diff_t} = \vec{x}_{grad\_gyro_t} - \vec{x}_{grad_{image\_based_t}} \quad (14)$$

where, $\vec{x}_{grad\_diff_t}$ corresponds to the difference between the gradient of the first motion vector and the second motion vector at time t;

$\vec{x}_{grad\_gyro_t}$ corresponds to the gradient of the output of gyro sensor at time t (does not reflect the DC component); and $\vec{x}_{grad_{image\_based_t}}$ corresponds to the gradient of the output of image-based global motion vector at time t.

Further, in accordance with an embodiment, it may also be determined whether the first motion sensor 228A, such as the gyro sensor, is in standstill state. The determination of the standstill state of the first motion sensor 228A may be based on two criteria. The two criteria may include at least a first criterion and a second criterion.

In accordance with an embodiment, the first criterion for determination of the standstill state of the first motion sensor 228A may correspond to a variance associated with the difference between the gyro data at time t and the gyro data at time t−1 is smaller than a determined first variance threshold value. The first criterion may be expressed by the following mathematical expression (15):

$$|var_{gyro_t}| < thr_{gyrovar_1} \quad (15)$$

where, $$var_{gyro_t} = 1/n \Sigma_{k=t}^{t-n-1} (\vec{x}_{gyro_t} - \vec{x}_{gyro_{t-1}})^2$$

where, $\vec{x}_{gyro_t}$ corresponds to the gyro data that does not reflect the dc component at time t; and $\vec{x}_{gyro_{t-1}}$ corresponds to the gyro data that does not reflect the dc component at time t−1; and $thr_{gyrovar_1}$ corresponds to the determined first variance threshold value.

In accordance with an embodiment, the second criterion for determination of the standstill state of the first motion sensor 228A may correspond to the gyro data at time t that is smaller than a determined gyro data threshold value. The second criterion may be expressed by the following mathematical expression (16):

$$\vec{x}_{gyro_t} < thr_{gyrodata} \quad (16)$$

where, $\vec{x}_{gyro_t}$ corresponds to the gyro data that does not reflect the dc component at time t; and $thr_{gyrodata}$ corresponds to the determined gyro data threshold value.

In an instance, in an event that both the above described mathematical expressions (15) and (16) continue to be satisfied for some time period, it may be determined that the first motion sensor 228A is in standstill state. In such an instance, the processor 202 in conjunction with the offset computation unit 214 may determine the offset DC component of the gyro sensor based on the computed difference between the first motion vector and the second motion vector at time t, as given by the following mathematical expression (17):

$$\vec{x}_{gyro\_dc_t} = \vec{x}_{diff_t} \quad (17)$$

In another instance, in an event that both the above described mathematical expressions (15) and (16) are not satisfied, it may be determined that the first motion sensor 228A is not in standstill state. In such an instance, the processor 202 in conjunction with the offset computation unit 214 may be further configured to determine whether the first motion sensor 228A, such as the gyro sensor, is in stable state. The determination of the stable state of the first motion sensor 228A may be further based on two criteria. The two criteria may include at least a first criterion and a second criterion.

In accordance with an embodiment, the first criterion for determination of the stable state of the first motion sensor 228A may correspond to a variance of difference between the first motion vector and the second motion vector that is smaller than a determined second variance threshold value. The first criterion may be expressed by the following mathematical expression (18):

$$var_{diff_t} < thr_{diff} \quad (18)$$

where, $$var_{diff_t} = \frac{1}{n}\Sigma_{k=t}^{t-n-1}\left(\overline{X_{diff_k}} - \overline{X_{diff}}\right)^2 \text{ and}$$

where, $$\overline{X_{diff}} = \frac{1}{n}\Sigma_{k=t}^{t-n-1}\overline{X_{diff_k}}$$

and
where, $\vec{x}_{diff_k}$ corresponds to the difference between the first motion vector and the second motion vector at time k; and $thr_{diff}$ corresponds to the determined second variance threshold value.

In accordance with an embodiment, the second criterion for determination of the stable state of the first motion sensor 228A may correspond to a variance of the difference of the gradient between the first motion vector and the second motion vector that is smaller than a determined third variance threshold value. The second criterion may be expressed by the following mathematical expression (19):

$$\mathrm{var}_{grad\_diff_t} < thr_{grad\_diff} \qquad (19)$$

where, $$\mathrm{var}_{grad\_diff_t} = \frac{1}{n}\Sigma_{k=t}^{t-n-1}\left(\overrightarrow{X_{grad\_diff_k}} - \overline{\overrightarrow{X_{grad\_diff}}}\right)^2 \text{ and}$$

where, $$\overline{\overrightarrow{X_{grad\_diff}}} = \frac{1}{n}\Sigma_{k=t}^{t-n-1}\overrightarrow{X_{grad\_diff_k}}$$

where, $\overrightarrow{x_{grad\_diff_k}}$ corresponds to the difference between the gradient of the first motion vector and the second motion vector at time k; and $thr_{grad\_diff}$ corresponds to the third variance threshold value.

In an instance, in an event that both the above described mathematical expressions (18) and (19) continued to be satisfied for some time period, it may be determined that the first motion sensor 228A is in stable state. In such an instance, the processor 202 in conjunction with the offset computation unit 214 may determine the offset DC component of the gyro sensor based on the computed difference between the first motion vector and the second motion vector at time t, as given by the mathematical expression (17).

In another instance, in an event that both the above described mathematical expressions (18) and (19) are not satisfied, it may be determined that the first motion sensor 228A is not in stable state. In such an instance, the processor 202 in conjunction with the offset computation unit 214 may be configured to determine the offset DC component of the gyro sensor based on the computed difference between the first motion vector and the second motion vector at time t−1. In accordance with an embodiment, the offset DC component of the gyro sensor may not be easily changed and requires a certain time period for its value to be changed. Thus, the previous computed difference between the first motion vector and the second motion vector may be used as the offset DC component. The determined offset DC component of the gyro sensor may be given by the following mathematical expression (20):

$$\overrightarrow{x_{gyro\_dc_t}} = \overrightarrow{x_{diff_{t-1}}} \qquad (20)$$

In accordance with an embodiment, the computed offset DC component of the gyro sensor may be utilized in place of the default value, such as $\overrightarrow{x_{gyro_{preset}}}$ for normalization of the output of the first motion sensor 228A. In accordance with an embodiment, the offset DC component of the gyro sensor computed based on the above described mathematical expressions (11) to (20) may correspond to the first sensor offset of the current frame.

The validation unit 216 may detect the validation of the first motion vector, based on the second motion vector and one or more criteria. Relevant instructions for the one or more criteria may be retrieved from the external memory 204. The one or more criteria may comprise at least a first criterion, a second criterion, and a third criterion.

In accordance with an embodiment, the first criterion may correspond to a condition in which a distance between the first motion vector and the second motion vector is smaller than a determined first threshold value. The first criterion may be expressed by the following mathematical expression (19):

$$\sqrt{(v_{x_{image\_based}} - v_{x_{gyro}})^2 + (v_{y_{image\_based}} - v_{y_{gyro}})^2} < \mathrm{Thres}_{dist} \qquad (19)$$

where, $v_{x_{gyro}}$ corresponds to the output of second motion vector in yaw direction;

$v_{y_{gyro}}$ corresponds to the output of second motion vector in pitch direction;

$v_{x_{image\_based}}$ corresponds to the output of the first motion vector, such as the image-based global motion vector in the horizontal direction;

$v_{y_{image\_based}}$ corresponds to the output of the first motion vector, such as the image-based global motion vector in the vertical direction; and $\mathrm{Thres}_{dist}$ corresponds to the determined first threshold value.

In accordance with an embodiment, the second criterion may correspond to a condition in which an angle between the first motion vector and the second motion vector is smaller than a determined second threshold value. The second criterion may further correspond to a next condition in which the second motion vector is smaller than a determined threshold noise value. The second criterion may be expressed by the following mathematical expressions (20) and (21):

$$\theta < \mathrm{Thres}_\theta \qquad (20)$$

$$\sqrt{v_{x_{gyro}}^2 + v_{y_{gyro}}^2} < \mathrm{Thres}_{gyro\_noise} \qquad (21)$$

where,

θ corresponds to the angle between the first motion vector and the second motion vector;

$\mathrm{Thres}_\theta$ corresponds to a determined second threshold value;

$v_{x_{gyro}}$ corresponds to the output of second motion vector in yaw direction;

$v_{y_{gyro}}$ corresponds to the output of second motion vector in pitch direction; and $\mathrm{Thres}_{gyro\_noise}$ corresponds to the determined threshold noise value.

In accordance with an embodiment, the third criterion may correspond to a condition in which a rotational output of the first motion sensor 228A, such as the gyro sensor, is smaller than a determined third threshold value. The third criterion may be expressed by the following mathematical expression (22):

$$|v_{roll}| < \mathrm{Thres}_{vroll} \qquad (22)$$

where, $v_{roll}$ corresponds to the rotational output of the first motion sensor 228A, such as the gyro sensor; and $\mathrm{Thres}_{vroll}$ corresponds to the determined third threshold value.

Figure 3:
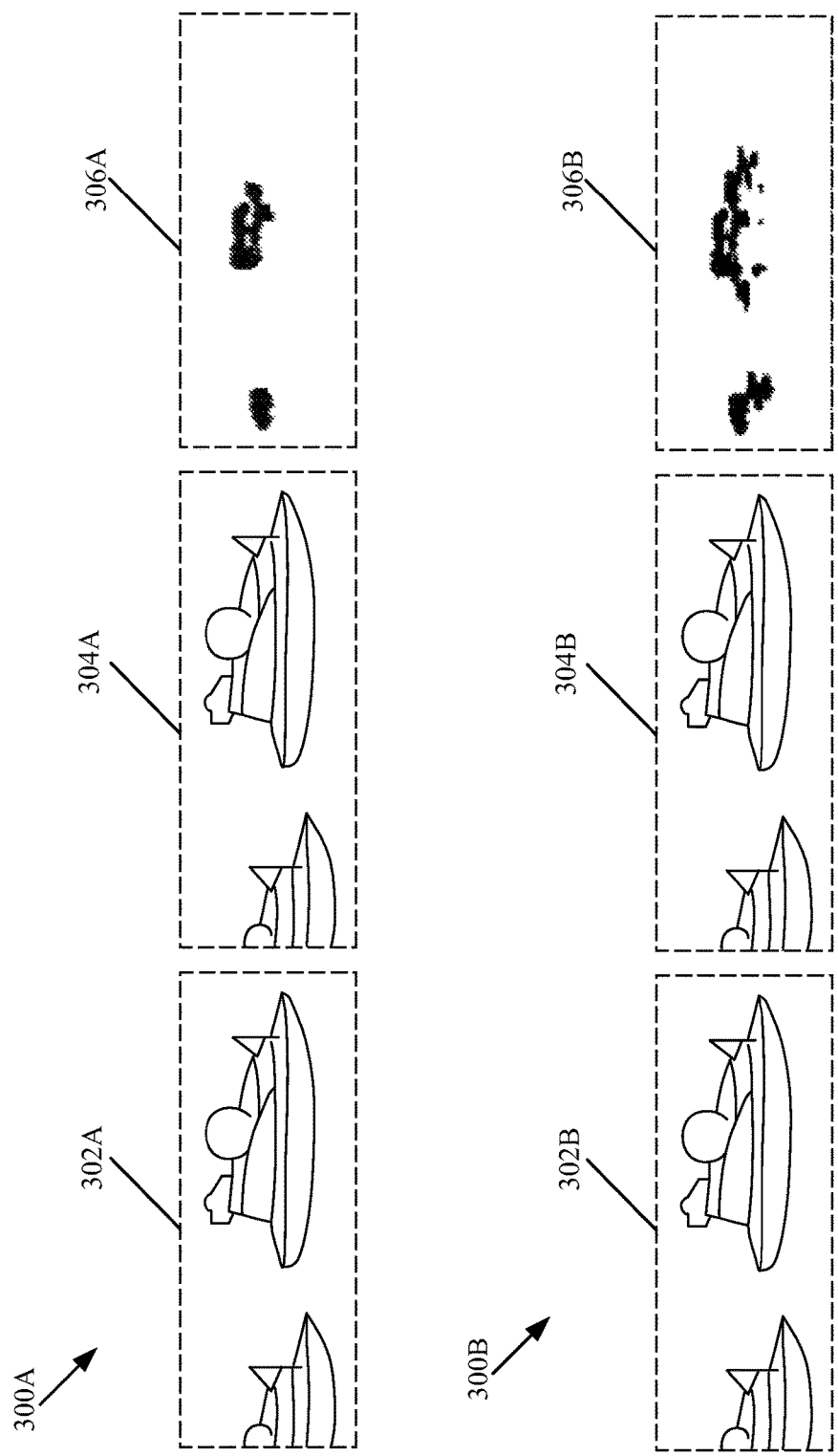
FIG. 3 illustrates an exemplary scenario for extraction of objects in motion by use of a motion sensor, in accordance with an embodiment of the disclosure.

Based on the validation of the first motion vector determined by the validation unit 216, in an instance, in an event that the first motion vector is valid, the extraction unit 218 may utilize the first sensor offset and the first motion vector to extract the object in motion from the current frame. An illustration of such an instance is depicted in FIG. 3. In another instance, in an event that the first motion vector is invalid, the extraction unit 218 may utilize the second motion vector to extract the object in motion from the current frame. Further, the computed first sensor offset based on above described mathematical expressions (11) to (20), may be utilized for correction of the first motion vector in an event that the first motion vector is determined to be invalid.

In accordance with an embodiment, the electronic device 102 may be further configured to determine a second sensor offset of a next frame based on the computed first sensor offset of the current frame in an event that the first motion vector is determined to be valid. Further, the electronic device 102 may be configured to determine the second sensor offset of the next frame based on a sensor offset of the previous frame in an event the first motion vector is determined to be invalid.

FIG. 3 illustrates exemplary scenarios for extraction of objects in motion, in accordance with an embodiment of the disclosure. With reference to FIG. 3, there is shown two exemplary scenarios 300A and 300B of a scene that includes a moving boat. The scene may be captured by an exemplary electronic device 102, such as a camcorder. The captured scene may correspond to a video and the moving boat may correspond to the object in motion. In the first exemplary scenario 300A, there is shown a previous image frame 302A, a current image frame 304A, and a resultant image frame 306A. In the second exemplary scenario 300B, there is shown a previous image frame 302B, a current image frame 304B, and a resultant image frame 306B.

With reference to the first exemplary scenario 300A, the previous image frame 302A may be captured at a time instant, t−1, and the current image frame 304A may be captured at next time instant, t. It may be assumed that the camcorder does not include the offset computation unit 214. The first motion vector computation unit 210, in the camcorder, may compute the first motion vector, i.e. the image-based global motion vector, based on the mathematical expressions (1), (2), and (3), as described in FIG. 2, applied on the previous image frame 302A and the current image frame 304A. Further, the second motion vector computation unit 212, in the camcorder, may compute the second motion vector, i.e. the motion sensor-based global motion vector, based on mathematical expression (4), as described in FIG. 2, based on the angular velocity information obtained from a motion sensor, such as the first motion sensor 228A and one or more device parameters related to the electronic device 102. However, the second motion vector computed by use of angular velocity information obtained from a motion sensor, such as the first motion sensor 228A, may include an offset value due to various intrinsic problems, such as mechanical vibration and variation in temperature that may have affected the output of the motion sensor. Consequently, the subsequent object extraction by the extraction unit 218 may also be inaccurate as shown in resultant image frame 306A.

With reference to the second exemplary scenario 300B, the previous image frame 302B may be captured at a time instant, t−1, and the current image frame 304B may be captured at next time instant, t. It may be assumed that the camcorder includes the offset computation unit 214. The first motion vector computation unit 210, in the camcorder, may compute the first motion vector, i.e. the image-based global motion vector, based on the mathematical expressions (1), (2), and (3), as described in FIG. 2, applied on the previous image frame 302B and the current image frame 304B. Further, the second motion vector computation unit 212, in the camcorder, may compute the second motion vector, i.e. the gyro-based global motion vector, based on the mathematical expression (4), as described in FIG. 2, applied on the previous image frame 302B and the current image frame 304B. Furthermore, the offset computation unit 214, in the camcorder, may be configured to compute the first sensor offset value based on the first motion vector and the second motion vector computed by the first motion vector computation unit 210 and the second motion vector computation unit 212, respectively.

In certain scenarios, in an event that the validation unit 216 determines that the computed first motion vector, such as the image-based global motion vector, is invalid, based on the one or more criteria, as described in FIG. 2. For an instance, the distance between the first motion vector and the second motion vector may be greater than the determined first threshold value. In such scenarios, the electronic device 102 may be configured to utilize the first sensor offset value computed by the offset computation unit 214 for correction of the first motion vector. Consequently, the extraction unit 218 may utilize the first sensor offset value computed by the offset computation unit 214 and the determined validation of the first motion vector performed by the validation unit 216 for extraction of the object in motion, i.e. the moving boat, as shown in the resultant image frame 306B.

Figure 4A:
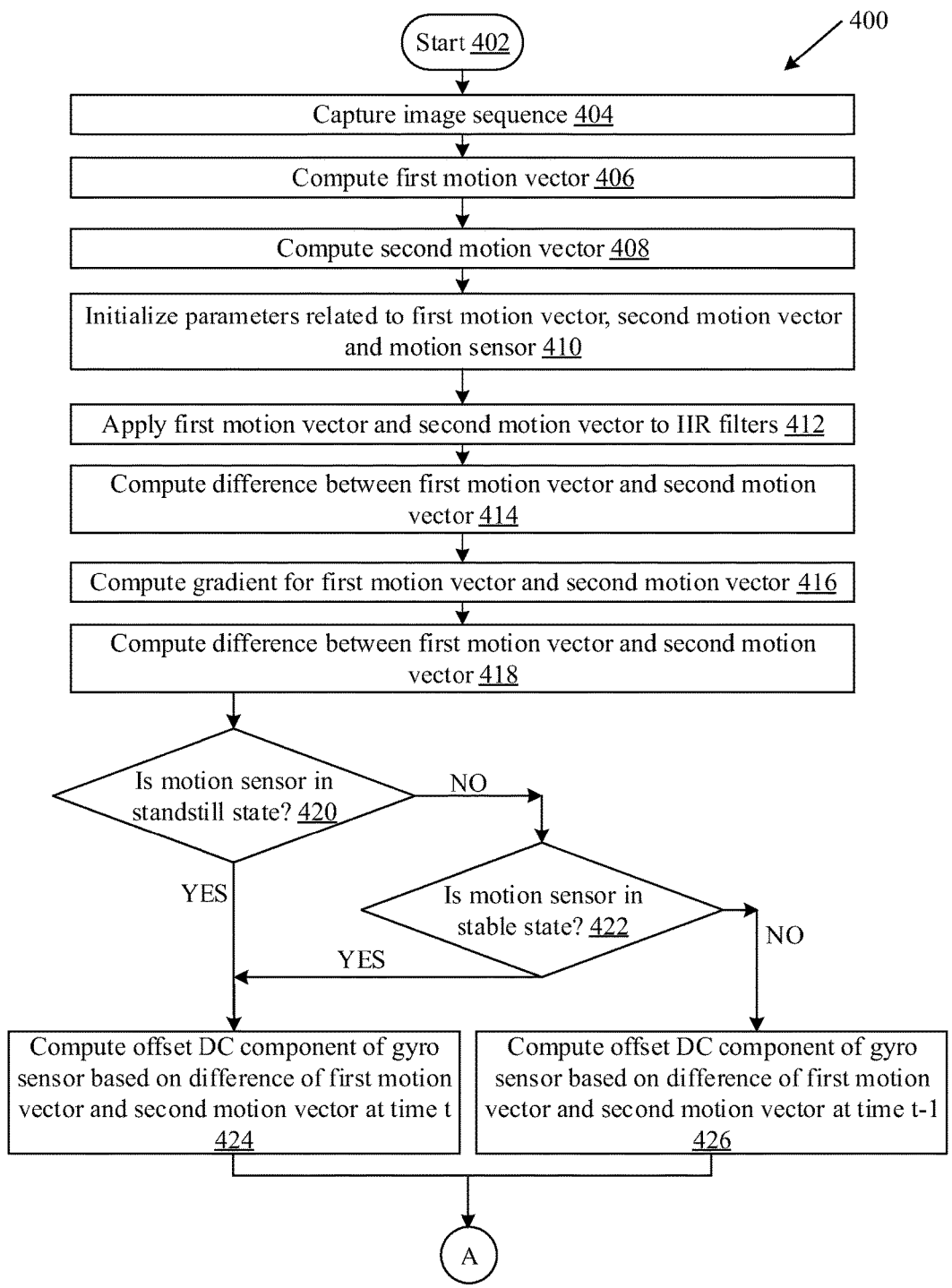
FIGS. 4A and 4B, collectively, depict a flow chart that illustrates an exemplary method for detection of objects in motion in an image processing system, in accordance with an embodiment of the disclosure.
Figure 4B:
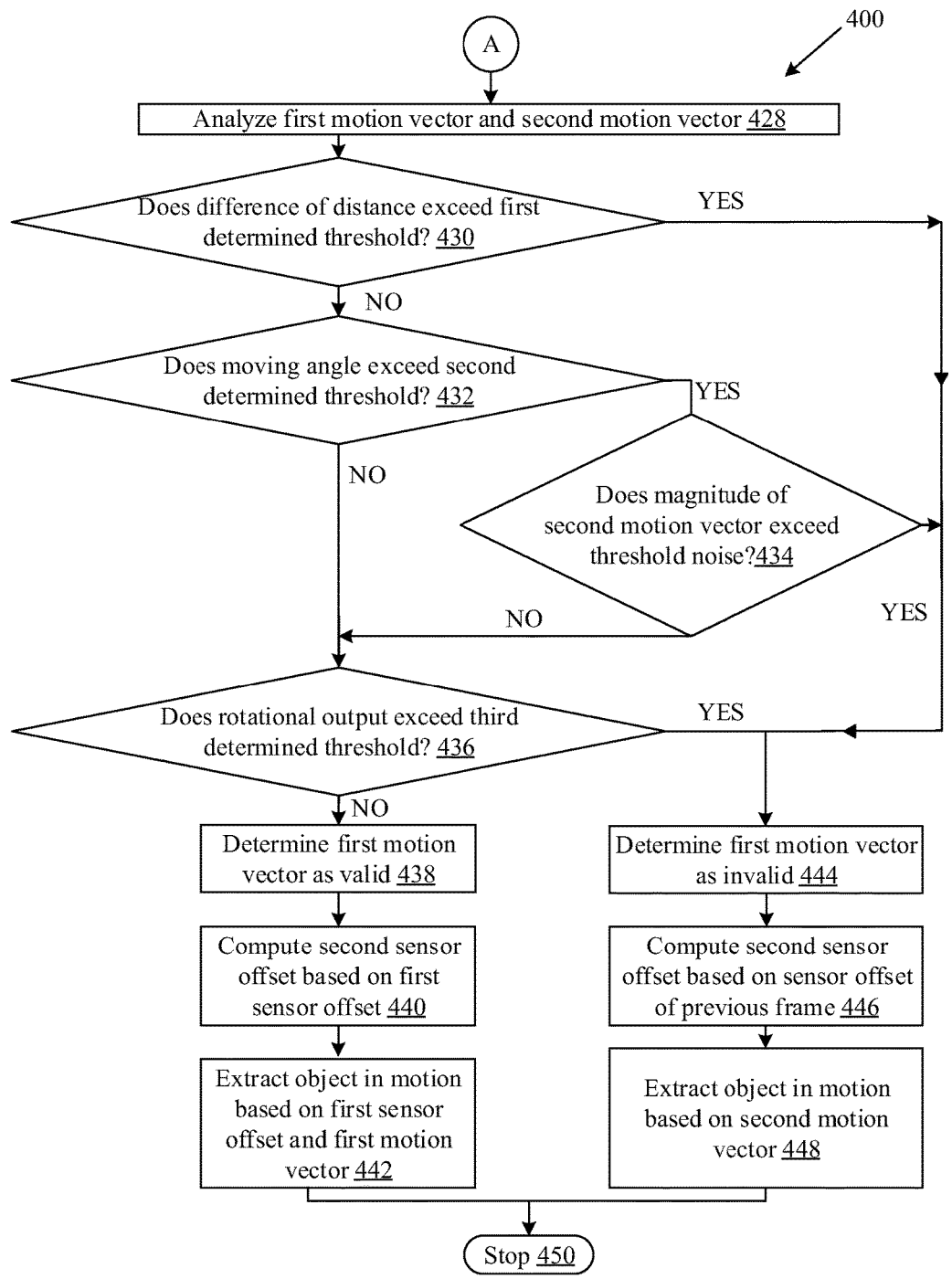

FIGS. 4A and 4B, collectively depict a flow chart that illustrates an exemplary method for detection of objects in motion in an image processing system, in accordance with an embodiment of the disclosure. With reference to FIG. 4A, there is shown a flowchart 400. The flowchart 400 is described in conjunction with FIG. 2. The method starts at 402 and proceeds to 404.

At 404, a video clip that includes a current frame and a previous frame may be captured. In accordance with an embodiment, the electronic device 102 may capture the video clip that includes the current frame and the previous frame. In accordance with an embodiment, the electronic device 102 may retrieve the video clip from the external memory 204.

At 406, a first motion vector may be computed. In accordance with an embodiment, the first motion vector computation unit 210 may be configured to compute the first motion vector, such as the image-based global motion vector, based on difference of pixel values of one or more pixels in a current frame with respect to a previous frame. The first motion vector may be computed based on the mathematical expressions (1), (2), and (3), as described in FIG. 2.

At 408, a second motion vector may be computed. In accordance with an embodiment, the second motion vector computation unit 212 may be configured to compute the second motion vector, such as the motion sensor-based global motion vector, based on the angular velocity information obtained from a sensor, such as the first motion sensor 228A, in the electronic device 102. The second motion vector may be computed based on the mathematical expression (4), as described in FIG. 2.

At 410, various parameters related to the first motion vector, the second motion vector, and the motion sensor may be initialized. In accordance with an embodiment, the offset computation unit 214 may be configured to initialize various parameters related to the first motion vector, the second motion vector, and the motion sensor based on the mathematical expressions (6), (7), (8), (9), and (10), as described in FIG. 2.

At 412, the first motion vector and the second motion vector may be applied to IIR filters. In accordance with an embodiment, the first motion vector and the second motion vector computed by the first motion vector computation unit 210 and the second motion vector computation unit 212, respectively, may be applied to the IIR filters.

At 414, the difference between the first motion vector and the second motion vector may be computed. In accordance with an embodiment, the offset computation unit 214 may be configured to determine the difference between the first motion vector and the second motion vector based on the mathematical expression (11), as described in FIG. 2.

At 416, the gradient for the first motion vector and the second motion vector may be computed. In accordance with an embodiment, the offset computation unit 214 may be configured to compute the gradient of the first motion vector based on the mathematical expression (12), as described in FIG. 2. In accordance with an embodiment, the offset computation unit 214 may further be configured to compute the gradient of the second motion vector based on the mathematical expression (13), as described in FIG. 2.

At 418, the difference between the gradient of the first motion vector and the second motion vector may be computed. In accordance with an embodiment, the offset computation unit 214 may be configured to compute the difference between the gradient of the first motion vector and the second motion vector based on the mathematical expression (14), as described in FIG. 2.

At 420, it may be determined whether the first motion sensor 228A (Such as the gyro sensor) is in standstill state. In accordance with an embodiment, the offset computation unit 214 in conjunction with the processor 202 may be further configured to determine whether the first motion sensor 228A is in standstill state. The determination of the standstill state of the first motion sensor 228A may be based on at least a first criterion and a second criterion. In accordance with the first criterion, based on the mathematical expression (15), it may be determined whether a variance associated with the difference between the gyro data at time t and the gyro data at time t−1 is smaller than a determined first variance threshold value. In accordance with the second criterion, based on the mathematical expression (16), it may be determined whether the gyro data at time t that is smaller than a determined gyro data threshold value. In an instance, in an event that both the first criterion and the second criterion are satisfied, control passes to 424. In another instance, in an event that both the first criterion and the second criterion are not satisfied, control passes to 422.

At 422, it may be determined whether the first motion sensor 228A (such as the gyro sensor) is in stable state. In accordance with an embodiment, the offset computation unit 214 in conjunction with the processor 202 may be configured to determine the state of the first motion sensor 228A. The determination of the stable state of the first motion sensor 228A may be based on at least a first criterion and a second criterion. In accordance with the first criterion, based on the mathematical expression (18), it may be determined whether a variance of difference between the first motion vector and the second motion vector that is smaller than a determined second variance threshold value. In accordance with the second criterion, based on the mathematical expression (19), it may be determined whether a variance of the difference of the gradient between the first motion vector and the second motion vector that is smaller than a determined third variance threshold value. In an instance, in an event that both the first criterion and the second criterion are satisfied, control passes to 424. In another instance, in an event that both the first criterion and the second criterion are not satisfied, control passes to 426.

At 424, in an event that both the first criterion and the second criterion associated with the stable state and the standstill state are satisfied, the offset DC component of the gyro sensor may be computed based on the computed difference between the first motion vector and the second motion vector at time t. In accordance with an embodiment, the processor 202 in conjunction with the offset computation unit 214 may determine the offset DC component of the gyro sensor based on the computed difference between the first motion vector and the second motion vector at time t based on the mathematical expression (17). Control passes to 428 in FIG. 4B.

At 426, in an event that both the first criterion and the second criterion associated with the stable state and the standstill state are not satisfied, the offset DC component of the gyro sensor may be computed based on the computed difference between the first motion vector and the second motion vector at time t−1. In accordance with an embodiment, the processor 202 in conjunction with the offset computation unit 214 may determine the offset DC component of the gyro sensor based on the computed difference between the first motion vector and the second motion vector at time t−1 based on the mathematical expression (20). Control passes to 428 in FIG. 4B.

Referring to FIG. 4B, at 428, the first motion vector, such as the image-based global motion vector, and the second motion vector, such as the motion sensor-based global motion vector, may be analyzed. In accordance with an embodiment, the processor 202 may be configured to analyze the first motion vector and the second motion vector to perform validation of the first motion vector. In accordance with an embodiment, the validation of the first motion vector may be determined based on the second motion vector and one or more criteria. The one or more criteria may include at least a first, a second, and a third criterion.

At 430, it may be determined whether a difference of distance between the first motion vector and the second motion vector exceeds a determined first threshold value. In an instance, in an event that the difference of the distance exceeds the determined first threshold value, control passes to 444. In another instance, in an event that the difference of the distance is less than the determined first threshold value, control passes to 432.

At 432, in an event that the difference of the distance computed based on the first motion vector and the second motion vector is less than the determined first threshold value, it may be determined whether an angle between the first motion vector and the second motion vector exceeds a determined second threshold value. In an instance, in an event that the angle between the first motion vector and the second motion vector exceeds the determined second threshold value, control passes to 434. In another instance, in an event that the angle between the first motion vector and the second motion vector is less than the determined second threshold value, control passes to 436.

At 434, in an event that the angle between the first motion vector and the second motion vector exceeds the determined second threshold value, it may be further determined whether a magnitude of the second motion vector exceeds a determined threshold noise value. In an instance, in an event that the magnitude of the second motion vector exceeds the determined threshold noise value, control passes to 444. In another instance, in an event that the magnitude of the second motion vector is less than the determined threshold noise value, control passes to 436.

At 436, in an event that the angle between the first motion vector and the second motion vector is less the determined second threshold value and the magnitude of the second motion vector is less than the determined threshold noise value, it may be determined whether a rotational output of the sensor, such as the first motion sensor 228A in the electronic device 102, exceeds a determined third threshold value. In an instance, in an event that the rotational output of the sensor exceeds the determined third threshold value, control passes to 444. In another instance, in an event that the rotational output of the sensor is less than the determined third threshold value, control passes to 438.

At 438, the first motion vector is determined to be valid based on the second motion vector and the one or more criteria. In accordance with an embodiment, the validation unit 216 may determine the first motion vector to be valid. At 440, a second sensor offset may be computed for next frame based on the computed first sensor offset. In accordance with an embodiment, the electronic device 102 may be configured to determine the second sensor offset of the next frame based on the first sensor offset of the current frame. At 442, the object in motion from the current frame may be extracted. In accordance with an embodiment, the extraction unit 218 may be configured to extract the object in motion, based on the first sensor offset and the first motion vector, such as the image-based global motion vector. Control passes to end 450.

At 444, in an event that the difference between the distance exceeds the determined first threshold value, the angle between the first motion vector and the second motion vector exceeds the determined second threshold value, the magnitude of the second motion vector exceeds the determined threshold noise value, and the rotational output of the sensor exceeds the determined third threshold value, the first motion vector is determined to be invalid. At 446, a second sensor offset may be computed for the next frame based on a sensor offset of the previous frame. In accordance with an embodiment, the electronic device 102 may be further configured to determine the second sensor offset of the next frame based on the sensor offset of the previous frame. At 448, the extraction unit 218 may extract the object in motion from the current frame based on the second motion vector, such as the motion sensor-based global motion vector. Control passes to end 450.

Various embodiments of the disclosure encompass numerous advantages that includes an image processing system and method for extraction of objects in motion by use of motion sensors. Further, the method also helps to overcome the drift issue of the motion sensor and also helps to determine whether an image-based global motion vector is valid or invalid. The offset computation also helps to rectify the image-based global motion vector. Based on the determined validation of the image-based global motion vector and the accurate offset computed for the motion sensor, the accuracy of the extraction of object in motion from a current frame of a video clip is improved. With reference to the second exemplary scenario 300B in FIG. 3, it may be observed that the object in motion is extracted with a higher degree of accuracy as compared to the extraction in the first exemplary scenario 300A, based on the accurate computation of the offset value of the motion sensor.

Further, the method may rectify or correct the computation of the global motion vector that may be computed incorrectly due to various intrinsic and/or extrinsic factors, such as large foreground movement, blur, parallax, illuminance change, and/or roller shutter effect. Further, the method may also overcome the various limitation of the individual mechanical variations and change in temperature effects of the motion and sensor. Further, the method also reduces the usage of extra hardware such as the high pass filters (HPFs), thus reducing the overall circuit complexity of the image processing system. Thus, an improvement in the various field of image processing is provided as a result of the accurate detection and extraction of objects in motion.

In accordance with an embodiment of the disclosure, an image processing system for detection of objects in motion is disclosed. The electronic device 102 (FIG. 1) may correspond to an imaging device that may be used to capture a video. The captured video may include a current frame and a previous frame. The captured video may include at least an object in motion. The electronic device 102 may comprise one or more circuits, such as the offset computation unit 214 (FIG. 2), that may be configured to compute a first sensor offset based on a first motion vector and a second motion vector. The electronic device 102 may be configured to compute a first motion vector based on a difference of pixel values of one or more pixels in the current frame with respect to the previous frame. The current frame and the previous frame may comprise at least an object in motion. The one or more circuits, such as the second motion vector computation unit 212 (FIG. 2), may be configured to compute a second motion vector based on angular velocity information obtained from a sensor, such as a first motion sensor 228A. The one or more circuits, such as the validation unit 216 (FIG. 2), may be configured to determine validation of the first motion vector, based on the second motion vector and one or more criteria. The one or more criteria may include at least a first, a second, and a third criterion. The one or more circuits, such as the extraction unit 218 (FIG. 2), may be configured to extract the object in motion from the current frame, based on the first sensor offset and the determined validation of the first motion vector.

Various embodiments of the disclosure may provide a non-transitory computer readable medium and/or storage medium, wherein there is stored thereon, a machine code and/or a computer program with at least one code section executable by a machine and/or a computer to detect objects in motion. The at least one code section in the electronic device 102 may cause the machine and/or computer to perform the steps that comprise computation of a first sensor offset for a current frame based on a first motion vector and a second motion vector. The electronic device 102 may be configured to compute the first motion vector, based on a difference of pixel values of one or more pixels in a current frame with respect to a previous frame. The current frame and the previous frame may comprise at least an object in motion. The electronic device 102 may be further configured to compute the second motion vector based on angular velocity information obtained from a sensor, such as the first motion sensor 228A as illustrated in the block diagram 200 that may be implemented as an exemplary electronic device, such as the electronic device 102. A validation of the first motion vector may be determined based on the second motion vector and one or more criteria. The one or more criteria may include at least a first, a second, and a third criterion. The object in motion may be extracted from the current frame based on computed first sensor offset and the determined validation of the first motion vector.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein.

The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

What is claimed is:

1. An image processing system for detection of moving objects, said image processing system, comprising:
   one or more circuits in an electronic device configured to:
      compute a first sensor offset for a current frame based on a first motion vector and a second motion vector;
      determine validation of said first motion vector based on said second motion vector and one or more criteria; and
      extract an object in motion from said current frame based on said computed first sensor offset of said current frame and said determined validation of said first motion vector.

2. The image processing system according to claim 1, wherein said first motion vector corresponds to an image-based global motion vector, and wherein said second motion vector corresponds to a motion sensor-based global motion vector.

3. The image processing system according to claim 1, wherein said one or more circuits in said electronic device are further configured to compute said first motion vector based on a difference of pixel values of one or more pixels in said current frame with respect to a previous frame, wherein said current frame and said previous frame comprises at least an object in motion.

4. The image processing system according to claim 3, wherein said first sensor offset is utilized for correction of said computation of said first motion vector based on determination that said first motion vector is invalid.

5. The image processing system according to claim 1, wherein said one or more circuits in said electronic device are further configured to compute said second motion vector based on angular velocity information obtained from a sensor in said electronic device.

6. The image processing system according to claim 1, wherein said one or more circuits in said electronic device are further configured to determine a second sensor offset of a next frame based on said computed first sensor offset of said current frame based on determination that said first motion vector is valid.

7. The image processing system according to claim 1, wherein said one or more circuits in said electronic device are further configured to determine a second sensor offset of a next frame based on a sensor offset of a previous frame based on determination that said first motion vector invalid.

8. The image processing system according to claim 1, wherein said first motion vector is determined to be valid based on a first criterion of said one or more criteria and determination that a distance between said first motion vector and said second motion vector is smaller than a first threshold value.

9. The image processing system according to claim 1, wherein said first motion vector is determined to be valid based on a second criterion of said one or more criteria and determination that an angle between said first motion vector and said second motion vector is smaller than a second threshold value.

10. The image processing system according to claim 9, wherein said first motion vector is further determined to be valid based on said second criterion of said one or more criteria and determination that a magnitude of said second motion vector is smaller than a threshold noise value.

11. The image processing system according to claim 1, wherein said first motion vector is determined to be valid based on a third criterion of said one or more criteria and determination that a rotational output of a sensor in said electronic device is smaller than a third threshold value.

12. The image processing system according to claim 1, wherein said first motion vector is associated with a minimum sum of absolute difference of pixel values of one or more pixels between said current frame and a previous frame.

13. The image processing system according to claim 1, wherein said one or more circuits in said electronic device are further configured to compute said second motion vector based on one or more device parameters of said electronic device, and wherein said one or more device parameters comprise focal length of a lens of said electronic device, and number of horizontal pixels and width of an imager component included in said electronic device.

14. The image processing system according to claim 1, wherein said one or more circuits in said electronic device are further configured to extract said object in motion from said current frame based on said second motion vector based on determination that said first motion vector is invalid.

15. The image processing system according to claim 1, wherein said one or more circuits in said electronic device are further configured to compute said first sensor offset of said current frame based on a difference between said first motion vector and said second motion vector.

16. The image processing system according to claim 1, wherein said one or more circuits in said electronic device are further configured to compute said first sensor offset of said current frame based on a difference between a gradient of said first motion vector and said second motion vector.

17. The image processing system according to claim 1, wherein said electronic device corresponds to an imaging device that is configured to capture said current frame and a previous frame.

18. The image processing system according to claim 1, wherein said first sensor offset corresponds to an offset computed for a gyro sensor of said electronic device.

19. An image processing method for detection of moving objects, said image processing method comprising:
   computing a first sensor offset for a current frame based on a first motion vector and a second motion vector;

determining validation of said first motion vector based on said second motion vector and one or more criteria; and extracting an object in motion from said current frame based on said computed first sensor offset of said current frame and said determined validation of said first motion vector.

20. The image processing method according to claim 19, wherein said extraction of said object in motion from said current frame is based on said second motion vector based on determination that said first motion vector is invalid.

\* \* \* \* \*